April 18, 1939.    N. M. SLEEPER ET AL    2,155,335
FISH LURE
Filed March 17, 1938
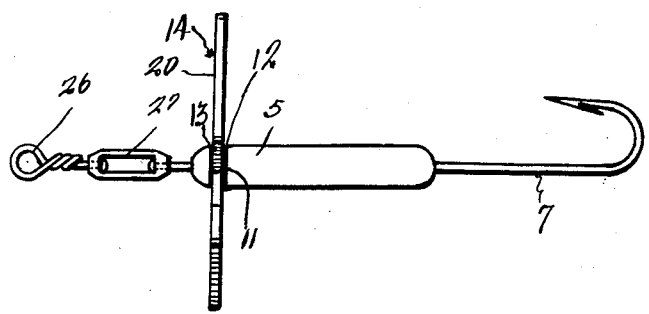
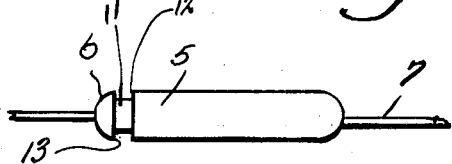
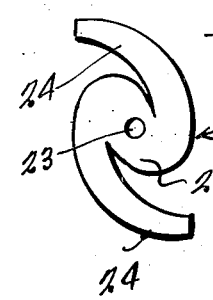
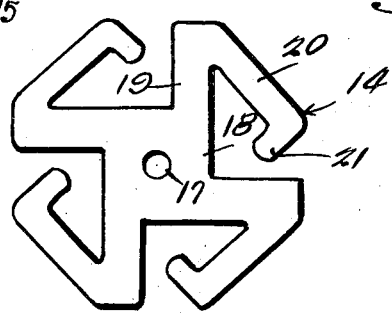
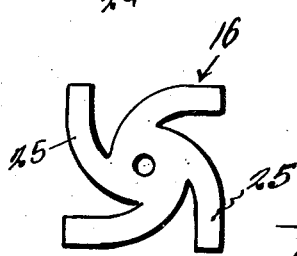
*Inventor*
Ned M. Sleeper
H. V. Keeling
By Clarence A. O'Brien
Hyman Berman
*Attorneys*

Patented Apr. 18, 1939

2,155,335

UNITED STATES PATENT OFFICE 2,155,335

FISH LURE

Ned M. Sleeper and Herbert Vincent Keeling, Lakeport, Calif.

Application March 17, 1938, Serial No. 196,516

3 Claims. (Cl. 43—42)

The present invention appertains to new and useful improvements in fish lures and more particularly to lures of the type wherein a flexible element is employed as a fish attracting agent.

An important object of the invention is to provide a lure including a flexible element which will rotate when the lure is pulled through the water.

Another important object of the invention is to provide a lure which is of simple construction and not susceptible to the ready development of defects.

These and various other important objects and advantages of the invention will become apparent to the reader of the following specification.

In the drawing:

Figure 1 represents a side elevational view of the lure.

Figure 2 is a fragmentary side elevational view of the lure with the tail portion and spinner removed.

Figure 3 is a plan view of one of the spinners.

Figure 4 is a second form of spinner.

Figure 5 is a plan view of the third form of spinner.

Referring to the drawing wherein like numerals designate like parts, it can be seen that numeral 5 denotes an elongated body of cylindrical shape constructed of lead or some other heavy substance having its ends rounded off as at 6, and a hook 7 extending from its rear end.

In close proximity to the front end of the body is formed an annular groove 11 which defines the shoulders 12—13, the groove receiving either one of the spinners 14, 15 or 16.

These spinners are of flexible material made up of pork rind, Cellophane, thin rubber or any other suitable material. The spinner 14 has a centrally located opening 17 through which the body 5 is pushed until the edge portion of the spinner at the opening 17 receives into the groove 11, where it will remain against accidental displacement.

The form of spinner shown at 14 in Figure 3 consists of a square-shaped central portion 18 having laterally disposed leg portions 19 extending from the edge portions of the portion 18 and these leg portions have backwardly disposed oblique extensions 20 terminating in inwardly disposed end portions 21.

The form of spinner shown at 15 in Figure 4 consists of the central portion 22 having the opening 23 therein and the pair of arcuate laterally extending arms 24—24.

The form of the invention shown at 16 in Figure 5 is constructed in accordance with that shown in Figure 4 excepting that the arms are increased in number and these arms are denoted by reference characters 25.

Numeral 26 denotes a fishing line eye between which and the body 5 a swivel 27 is installed.

It can be seen, that the spinner can be of any desired color as can be the body 5.

As the lure is pulled through the water, the spinner will rotate on the body 5 as its arms and leg portions flex backwardly and to an appreciable degree will simulate the fin actions of a swimming fish. As the device is pulled through the water in a forward direction the arms flexing backwardly will cause the spinner to rotate in one direction and as the device moves rearwardly, such as when sinking in the water, the arms flex forwardly and thus the spinner will revolve in the same direction as it does when the device is pulled forwardly. In other words, regardless of the movement of the lure in one direction or the other the spinner will always rotate in the same direction.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A fish lure comprising an elongated body having an annular groove therein and a normally flat spinner formed of flexible material and having a centrally arranged hole therein, the walls of which fit in the groove for rotatably supporting the spinner on the body, the flexibility of the flat spinner causing it to flex in one direction or the other according to the direction of movement of the body in the water, which causes the spinner to revolve always in the same direction.

2. A fish lure comprising an elongated body having an annular groove therein adjacent the front end and a normally flat flexible spinner having a centrally arranged hole therein, the walls of which fit in the groove for rotatably supporting the spinner on the body, said spinner having outwardly extending arms thereon extending transversely of the axis of the body and in a direction opposite to the direction of rotation of the spinner, said spinner flexing in one direction or the other according to the direction of movement of the body in the water, and the flexed arms causing the spinner to rotate in the same direction as the body moves forwardly or rearwardly in the water.

3. A spinner lure for rotation on a supporting body comprising a hub part and a plurality of propeller arms extending from said hub part and flexible in opposite directions under movement in water in opposite directions to rotate said lure in the same direction, said arms extending transversely of the axis of the lure in a direction opposite to the direction of rotation of the latter.

NED M. SLEEPER.
HERBERT VINCENT KEELING.